United States Patent
Adler-Golden et al.

(10) Patent No.: US 7,337,065 B2
(45) Date of Patent: Feb. 26, 2008

(54) METHODS FOR ATMOSPHERIC CORRECTION OF SOLAR-WAVELENGTH HYPERSPECTRAL IMAGERY OVER LAND

(75) Inventors: Steven M. Adler-Golden, Newtonville, MA (US); Michael Matthew, Westford, MA (US); Alexander Berk, Sharon, MA (US); Lawrence S. Bernstein, Lexington, MA (US); Gail Anderson, Boulder, CO (US)

(73) Assignee: Spectral Sciences, Inc., Burlington, MA (US)

( * ) Notice: Subject to any disclaimer, the term of this patent is extended or adjusted under 35 U.S.C. 154(b) by 636 days.

(21) Appl. No.: 09/767,539

(22) Filed: Jan. 23, 2001

(65) Prior Publication Data

US 2002/0096622 A1    Jul. 25, 2002

(51) Int. Cl.
*G01W 1/00*    (2006.01)
(52) U.S. Cl. .............................................. 702/3; 702/5
(58) Field of Classification Search .................... 702/3, 702/5; 340/937
See application file for complete search history.

(56) References Cited

U.S. PATENT DOCUMENTS

| | | | | |
|---|---|---|---|---|
| 5,315,513 A | * | 5/1994 | Abreu et al. .................... | 702/3 |
| 5,471,056 A | * | 11/1995 | Prelat .......................... | 250/253 |
| 5,790,188 A | * | 8/1998 | Sun ............................. | 348/144 |
| 6,075,891 A | * | 6/2000 | Burman ........................ | 382/191 |
| 6,111,640 A | * | 8/2000 | Hedman et al. ............. | 356/300 |
| 6,161,075 A | * | 12/2000 | Cohen ........................... | 702/3 |

(Continued)

OTHER PUBLICATIONS

Matthew et al., Status of Atmospheric Correction Using a MODTRAN-Based Algorithm, Algorithms for Multispectral, Hyperspectral, and Ultraspectral Imagery VI, pp. 199-206, 2000.*

(Continued)

*Primary Examiner*—Eliseo Ramos-Feliciano
*Assistant Examiner*—Anthony Gutierrez
(74) *Attorney, Agent, or Firm*—Brian M. Dingman; Mirick, O'Connell, DeMallie & Lougee, LLP

(57) ABSTRACT

This invention discloses several improved methods of correcting for atmospheric effects on a remote image of the Earth's surface taken from above, wherein the image comprises a number of simultaneously acquired images of the same scene, each including a large number of pixels, each at a different wavelength band, and including infrared through ultraviolet wavelengths. One method is for retrieving the aerosol/haze amount (i.e., visible range) from an assumed ratio of in-band reflectances, rather than from an assumed reflectance value. Another method is for identifying cloud-containing pixels. This is used to improve the calculation of the spatially averaged radiance $L^*_e$ and reflectance $\rho_e$ images in standard equations. Another method greatly reduces the number of mathematical operations required to generate the reflectance values. This method operates by averaging the water vapor and $\rho_e$ values over small groups of neighboring pixels, so that the same A, B, S, $L^*_a$ parameter values may also be assigned to all pixels within the group. Yet another new method accounts for shifts in the wavelength calibration within the image, such as would be caused by spectral "smile". This method loops the calculation of A, B, S and $L^*_a$ over a set of possible wavelength shifts with respect to the input channel centers, and assigns the appropriate set of parameters to each pixel based on a pixel-location-dependent formula for the wavelength shift.

9 Claims, 1 Drawing Sheet

U.S. PATENT DOCUMENTS

| | | | | |
|---|---|---|---|---|
| 6,266,428 | B1* | 7/2001 | Flanigan | 382/100 |
| 6,356,646 | B1* | 3/2002 | Spencer | 382/103 |
| 6,422,508 | B1* | 7/2002 | Barnes | 244/3.16 |
| 6,484,099 | B1* | 11/2002 | Holzer-Popp et al. | 702/2 |
| 6,724,931 | B1* | 4/2004 | Hsu | 382/155 |
| 2002/0193971 | A1* | 12/2002 | Whitsitt et al. | 702/189 |

OTHER PUBLICATIONS

Tanre et al., Remote Sensing of Aerosol Properties Over Oceans Using the MODIS/EOS Spectral Radiances, Journal of Geophysical Research, vol. 102, No. D14, pp. 16,971-16,988, Jul. 27, 1997.*

B.-C. Gao, K.B. Heidebrecht and A.F.H. Goetz, *Atmosphere Removal Program (ATREM) Version 2.0 Users Guide*, Center for the Study of Earth from Space/CIRES, University of Colorado, Boulder, Colorado, 26 1996.

R.O. Green, D.A. Roberts, and J.E. Conel, "Characterization and Compensation of the Atmosphere for Inversion of AVIRIS Calibrated Radiance to Apparent Surface Reflectance," *Summaries of the Sixth Annual JPL Airborne Earth Science Workshop*, JPL Publication 96-4, vol. 1, Pasadena, California, pp. 135-146, 1996.

S.M. Adler-Golden, M.W. Matthew, L.S. Bernstein, R.Y. Levine, A. Berk, S.C. Richtsmeier, P.K. Acharya, G.P. Anderson, G. Felde, J. Gardner, M. Hoke, L.S. Jeong, B. Pukall, J. Mello, A. Ratkowski and H.-H. Burke, Atmospheric Correction for Short-wave Spectral Imagery based on MODTRAN4, *SPIE Proceeding, Imaging Spectrometry V*, 3753, pp. 61-69, 1999.

A. Berk, L. S. Bernstein, G. P. Anderson, P. K. Acharya, D. C. Robertson, J.H. Chetwynd and S. M. Adler-Golden, "MODTRAN Cloud and Multiple Scattering Upgrades with Application to AVIRIS," *Remote Sensing Environment* 65, 367, 1998.

E.F. Vermote, D. Tanre, J.L. Deuze, M. Herman and J.J. Morcrette, , *Second Simulation of the Satellite Signal in the Solar Spectrum (6S)*, 6S User Guide Version 6.0, NASA-GSFC, Greenbelt, Maryland, 134, 1994.

R. Richter, "Atmospheric Correction of DAIS Hyperspectral Image Data," *SPIE Aerosense '96 Conference*, Orlando, FL, Apr. 8-12, SPIE Proceedings, 2758, 1996.

E.F. Vermote, N. El Saleous, C.O. Justice, Y.J. Kaufman, J.L. Privette, L. Remer, J.C. Roger and D. Tanre, "Atmospheric Correction of Visible to Middle-Infrared EOS-MODIS Data Over Land Surfaces: Background, Operational Algorithm and Validation," *J. Geophys. Res.*, 102, pp. 17131-17141, 1997.

Y. J. Kaufman, D. Tanre, L. A. Remer, E. F. Vermote, A. Chu, and B. N. Holben, "Operational Remote Sensing of Tropospheric Aerosol over Land from EOS Moderate Imaging Spectroradiometer," *J. Geophys. Res.* 102, 17051, 1997.

Y.J. Kaufman, A.E. Wald, L.A. Remer, B.-C. Gao, R.-R. Li, and L. Flynn, "The MODIS 2.1-μm Channel—Correlation with Visible Reflectance for Use in Remote Sensing of Aerosol," *IEEE Transactions on Geoscience and Remote Sensing*, 35, pp. 1286-1298, 1997.

S.A. Ackerman, K.I. Strabala, W.P. Menzel, R.A. Frey, C.C. Moeller, and L.E. Gumley, "Discriminating Clear Sky from Clouds with MODIS," *J. Geophys. Res.* 103, 32141, 1998.

C.C. Borel, P.V. Villeneuve, W.B. Clodius, J.J. Szymanski, and A.B. Davis, "Practical Atmospheric Correction Algorithms for a Multispectral Sensor from the Visible through the Thermal Spectral Regions," *SPIE '99 Paper, Conf.* 3717-19, Los Alamos National Laboratory Report No. LA-UR-99-1374, 1999.

* cited by examiner

METHODS FOR ATMOSPHERIC CORRECTION OF SOLAR-WAVELENGTH HYPERSPECTRAL IMAGERY OVER LAND

FIELD OF THE INVENTION

This invention relates to methods of correcting multispectral and hyperspectral images of the earth's land surfaces for atmospheric effects and calibration induced errors.

BACKGROUND OF THE INVENTION

The prior art for atmospheric correction of spectral imagery (that is, the retrieval of surface reflectance spectra from measured radiance spectra) at wavelengths where the source of light is the sun is embodied in various methods described in the literature. The simplest method is the "Empirical Line Method". It assumes that the radiance image contains some pixels of known reflectance, and also that the radiance and reflectance values for each wavelength channel of the sensor are linearly related; therefore, the image can be converted to reflectance by applying a simple gain and offset derived from the known pixels. This method is however not generally applicable. In-scene known reflectances are often not available, and the linearity assumption, which presumes a uniform atmosphere throughout the scene, may not be accurate. Therefore, an alternative method based on a first-principles radiation transport model is required. The phenomenology and methods differ somewhat for images of land and water; the focus here is on methods appropriate for scenes consisting mainly of land.

For hyperspectral imagery, which contains many tens to hundreds of wavelength channels, the most commonly used atmospheric correction computer code at the present time is ATREM [Gao et al., 1996]. The inputs to ATREM consist basically of the center wavelengths and widths of the sensor channels, the location and time of the measurement (which defines the sun angle), the sensor altitude and surface elevation, a specified aerosol/haze type and amount (as defined by a visible range), and a specified default model atmosphere (that is, one of a choice of embedded atmospheric descriptions, such as a seasonal/latitude model or the US Standard model, etc.). The sensor view is assumed to be in the nadir direction. Another atmospheric correction code for hyperspectral imagery has been developed by Green et al. [1996] for processing data from the AVIRIS sensor. Green's method requires additional input from a calibration image, and is therefore not applicable to general hyperspectral data. Recently, a method has been developed by Spectral Sciences, Inc. (SSI) and the Air Force Research Laboratory (AFRL) [Adler-Golden et al., 1999] that combines the essential features and inputs of ATREM with a more advanced treatment of the radiation transport physics similar to that found in the multispectral atmospheric correction code ATCOR2 [Richter, 1996]. The radiation transport model used in the SSI/AFRL method is the most recent version of the MODTRAN band model-based code, currently MODTRAN4 [Berk et al., 1998]. ATCOR2 and Green's method are also based on versions of MODTRAN. This method is suitable for off-nadir as well as nadir viewing. In contrast, ATREM uses the 6S code [Vermote et al., 1994] to model atmospheric scattering and accounts for molecular absorption using a transmittance factor derived from a separate model.

For technical details of the general first-principles atmospheric correction methodology, one may start with a standard equation for spectral radiance L* at a sensor, as associated with a given surface pixel, $$L^* = A\rho/(1-\rho_e S) + B\rho_e/(1-\rho_e S) + L^*_a \quad \text{equation (1)}$$

which applies for UV through short wave infrared (SWIR) wavelengths, where thermal emission is negligible. Here $\rho$ is the pixel surface reflectance, $\rho_e$ is an average surface reflectance for the pixel and the surrounding region, S is the spherical albedo of the atmosphere (i.e., the atmospheric reflectance for upwelling radiation), $L^*_a$ is the radiance backscattered by the atmosphere, and A and B are coefficients that depend on atmospheric and geometric conditions. The first term in Equation (1) corresponds to the radiance from the surface that travels directly into the sensor, while the second term corresponds to the radiance from the surface that is scattered by the atmosphere into the sensor. The distinction between $\rho$ and $\rho_e$ accounts for the "adjacency effect" (spatial mixing of radiance among nearby pixels) caused by atmospheric scattering. The adjacency effect correction may be ignored by setting $\rho_e = \rho$.

For a specified model atmosphere the values of the parameters A, B, S and $L^*_a$ in Equation (1) are determined from the radiation transport model. For example, in the SSI/AFRL method these values are derived empirically from the standard MODTRAN outputs of total and direct-from-the-ground spectral radiances computed at three different surface reflectance values, 0, 0.5 and 1. In ATREM the parameters are derived directly from the 6S code and the molecular absorption model. In both methods the viewing and solar angles of the measurement and nominal values for the surface elevation, aerosol type and visible range for the scene are used as inputs.

The water vapor profile is not generally known for the scene in question, and furthermore it may vary across the scene. To account for this, the calculations to determine A, B, S and $L^*_a$ are looped over a series of varying water column amounts, then selected wavelength channels of the image are analyzed to retrieve an estimated column water vapor amount for each pixel. For example, the SSI/AFRL method gathers radiance averages for two sets of channels, an "absorption" set centered at a water band (typically the 1.13 micron band) and a "reference" set of channels taken from the edge of the band. A 2-dimensional look-up table (LUT) for retrieving the water vapor from these radiances is constructed. One dimension of the table is the "reference" to "absorption" ratio and the other is the "reference" radiance. The second dimension accounts for a reflectance-dependent variation in the ratio arising from the different amounts of absorption in the atmospherically-scattered and surface-reflected components of the radiance. In ATREM this ratio variation is not taken into account, so a 1-dimensional LUT based on the ratio alone is used.

After the water retrieval is performed, Equation (1) is solved for the pixel surface reflectances in all of the sensor channels. The SSI/AFRL and ATCOR2 codes use a method described by Vermote et al. [1997] in which a spatially averaged radiance image $L^*_e$ is used to generate a good approximation to the spatially averaged reflectance $\rho_e$ via the approximate equation $$L^*_e = (A+B)\rho_e/(1-\rho_e S) + L^*_a \quad \text{equation (2)}$$

The spatial averaging is performed using a point-spread function that describes the relative contributions to the pixel radiance from points on the ground at different distances from the direct line of sight. The SSI/AFRL code approximates this function as a wavelength-independent radial exponential, while ATCOR2 uses a simple square array of pixels. ATREM ignores spatial averaging entirely and sets $\rho_e = \rho$. This amounts to neglect of the adjacency effect, and leads to considerable errors in scenes containing substantial amounts of aerosols s(including haze) and/or strong brightness contrasts among the surface materials.

A procedure analogous to the water vapor determination can be used to retrieve an approximate scene elevation map from a hyperspectral image. Here the radiation transport calculations are looped over elevation rather than water vapor concentrations and an absorption band of a uniformly mixed gas such as $O_2$ or $CO_2$ is interrogated. Reasonable relative elevations have been obtained from AVIRIS images using the 762 nm $O_2$ band (as a default) or the 2.06 μm $CO_2$ band.

In the prior discussion it has been assumed that the quantity of aerosol or haze in the scene to be analyzed has been adequately estimated. Both ATCOR2 and the SSI/AFRL code incorporate methods for retrieving an estimated aerosol/haze visible range from one or more "reference" surfaces in the scene where the reflectance is known for some wavelength channel(s). Best results are obtained using short (i.e., visible) wavelengths and either a very dark surface, such as green vegetation or deep calm water, or a very bright surface, such as a white calibration target that is large enough to fill at least one pixel. In the SSI/AFRL method the aerosol/haze retrieval operates as follows. The calculations to determine A, B, S and $L^*_a$ are carried out over a bandpass containing the selected sensor channel(s), but instead of looping over a series of water vapor values as described previously they are looped over a series of visible range values, e.g. 200, 100, 50, 33, 25, 20 and 17 km, that are evenly spaced in their reciprocals (optical depths). This process is undertaken only over spectral ranges or bandpasses where water vapor absorption has little impact. The user chooses the reference pixels and assigns them each a mean reflectance value for the selected channels. A 2-dimensional LUT relating the visible range reciprocal to the pixel radiance and the spatially averaged radiance is then constructed. The visible range is reported for each reference pixel by interpolating from the LUT, and if desired the results can be combined to form an average for the scene. It should be noted that the above method, unlike many others, takes the adjacency effect into account. When the reference pixels are taken from small areas in an image, such as calibration panels or isolated patches of vegetation, the adjacency effect correction becomes critical for an accurate result.

Limitations of the Prior Art

The prior art methods for atmospheric correction of spectral imagery over land work adequately for many but not all conditions. In particular, they assume cloud-free conditions, the presence of at least one material in the scene with a known reflectance at a visible wavelength, an accurate and consistent wavelength calibration throughout the image, and sufficient computing time to perform tens of mathematical operations per image pixel per wavelength channel. As described below, problems arise when these conditions are not met.

Cloudy conditions. Clouds pose several problems for atmospheric correction. Not surprisingly, pixels containing either a cloud or a cloud shadow are not converted to true surface reflectance by the prior art methods. Less obvious is the fact that clouds can adversely affect the reflectance retrieval accuracy even in cloud- and shadow-free parts of the scene. This is because the clouds contaminate the spatially averaged radiance $L^*_e$ used in Equation (2) to generate the spatially averaged reflectance $\rho_e$. According to theory, $\rho_e$ should account only for reflecting material that is below the scattering atmosphere. Clouds can be embedded throughout the molecular scattering layers, anywhere within the troposphere, 0-12 km. which are important sources of radiance at the very shortest (blue-violet) wavelengths. However, clouds usually lie above the aerosol and haze layers (approximately 0-2 km for the boundary) that dominate the scattering in the rest of the spectrum. Since clouds are typically brighter than the terrain, they can lead to an overestimation of $\rho_e$, and hence underestimated surface reflectance retrievals. Therefore it is desirable to identify and "remove" the clouds prior to the calculation of $\rho_e$.

Absence of accurately known surfaces. For the purpose of aerosol/haze amount retrieval, vegetation, water, or other dark surfaces can frequently be identified in a scene. However, reflectance values for these surfaces at appropriate wavelengths are often not known to within the accuracy needed (around 0.01 reflectance units or better) for an accurate retrieval. Even with "calibrated" surfaces the reflectance may not be known to within this accuracy because of measurement complications caused by non-Lambertian bidirectional reflectance distribution functions. Therefore, an aerosol/haze retrieval method is needed that is less prone to reflectance estimation errors.

Wavelength calibration error and non-uniformity. The prior art methods presume that the center wavelengths and shapes of the channel response functions ("slit" functions) are correctly specified by the input values. In practice, the actual wavelength centers in hyperspectral sensors can differ from their presumed values by a sizable fraction of the channel width. This leads to large errors (up to tens of percent) in the retrieved reflectance spectra near atmospheric absorption features. Prior art methods do not account for these wavelength errors except in so far as the user may attempt to model them by trial and error, which is a tedious and time-consuming process. In addition, in sensors with a two-dimensional focal plane array there is often a significant non-uniformity of the wavelength calibration across the image; this may be due to curvature of the image of the spectrometer slit on the focal plane (referred to as spectral "smile"), misalignment of the focal plane and spectrograph, or other effects. Prior art atmospheric correction codes do not account for these sources of wavelength non-uniformity.

Computing time constraints. For a typical hyperspectral image containing several hundred or more spectral channels and hundreds of thousands of pixels or more, the speed of the atmospheric correction is fundamentally limited by the mathematical operations required to generate the reflectance values for each pixel and channel from the Equation (1) parameters. The prior art methods (e.g, ATREM, SSI/AFRL), which account for pixel-specific values of water vapor and possibly other quantities such as $\rho_e$, require tens of operations per pixel-channel. Many of the operations are consumed in interpolating to find the appropriate A, B, S and $L^*_a$ parameters for each pixel, and even more would be required to account for spectral "smile", for example. A more efficient procedure is needed for high-speed (near-real-time) atmospheric correction.

SUMMARY OF THE INVENTION

The present invention is implemented in a computer code that extends and improves upon the prior art SSI/AFRL method for atmospheric correction of spectral imagery over land to generate the reflectance spectrum ρ. The invention addresses the four abovementioned limitations using the methods and embodiments summarized below:

Aerosol retrieval method. A new method for retrieving the aerosol/haze amount (i.e., visible range) from an assumed ratio of in-band reflectances, rather than from an assumed reflectance value, is included in the present invention. This method can utilize user-selected pixels or alternatively can operate in an automated mode in which it identifies suitable "dark" pixels.

Cloud identification. A method for identifying cloud-containing pixels is included in the present invention, and is used to improve the calculation of the spatially averaged radiance $L^*_e$ and reflectance $\rho_e$ images in Equations (1) and (2). Since this method requires a prior water vapor retrieval, the order and number of steps in the atmospheric correction process has been altered to accommodate it. The sequence of steps in the prior art SSI/AFRL method is (1) generation of spatially averaged radiance image, (2) aerosol/haze retrieval, (3) water vapor retrieval, (4) generation of $\rho_e$ and $\rho$. The sequence of steps in the present invention to accommodate cloud identification and masking is (1) preliminary water vapor retrieval using an estimated visible range, (2) cloudy pixel identification, (3) generation of spatially averaged radiance image with the cloudy pixels removed, (4) aerosol/haze retrieval, (5) water vapor retrieval with the retrieved visible range, (6) generation of $\rho_e$ and $\rho$ from Equations (1) and (2).

Reflectance calculation speedup. A new method is included in the present invention that greatly reduces the number of mathematical operations required to generate the reflectance values. The method operates by averaging the water vapor and $\rho_e$ values over small groups of neighboring pixels, so that the same A, B, S, $L^*_a$ parameter values may also be assigned to all pixels within the group. Once these values have been assigned, generation of the reflectance for each pixel within the group requires only two arithmetic operations per channel, a decrease of an order of magnitude compared to the prior art.

Spectral smile compensation. A new method is included in the present invention that accounts for shifts in the wavelength calibration within the image, such as would be caused by spectral smile. The method loops the calculation of A, B, S and $L^*_a$ over a set of possible wavelength shifts with respect to the input channel centers, and assigns the appropriate set of parameters to each pixel based on a pixel-location-dependent formula for the wavelength shift. The method could also be adapted to account for an image-wide calibration error.

First embodiment of the invention. This invention features in one embodiment an improved method of correcting for atmospheric effects on a remote image of the Earth's surface taken from above, wherein the image comprises a number of images of the same scene each including a large number of pixels, each at a different wavelength band, and including ultraviolet through infrared wavelengths, comprising: providing a radiation transport model that relates spectral radiance to spectral reflectance via a set of parameters; providing a discrete number of trial visibility values; using the radiation transport model to calculate the model parameter values for each of the trial visibilities; selecting image pixels having a presumed, predefined ratio of reflectances in two different wavelength bands; using the radiation transport model parameters to determine the surface reflectance for the selected image pixels for each of the two selected wavelength bands for each trial visibility; comparing the determined surface reflectances to the predefined ratio of reflectances; determining from the comparison the difference between the determined reflectance and the ratio-predicted reflectance for at least one of the two selected wavelength bands; and resolving from the comparison and the trial visibility values, a corrected image visibility value.

Second embodiment of the invention. In another embodiment the invention features an improved method of correcting for atmospheric effects on a remote image of the Earth's surface taken from above, wherein the image comprises a number of simultaneously acquired images of the same scene, each including a large number of pixels, each at a different wavelength band, and including infrared through ultraviolet wavelengths, comprising: providing a radiation transport model that relates spectral radiance to spectral reflectance via a set of parameters; providing a discrete number of trial column water vapor amounts; using the radiation transport model to calculate the model parameter values for each of the trial column water vapor amounts at wavelengths within and outside at least one water vapor absorption band; initially determining the column water vapor amount for each pixel from comparisons of the observed radiances at those wavelengths with calculations based on the model parameters for each trial column water vapor amount; determining pixels that likely include a cloud, such as by performing on each pixel a brightness test, a color balance test, and a low-water test, and for such pixels that pass these tests replacing the actual radiance with a presumed radiance; resolving the visibility value for the image; refining the determined column water vapor amounts for the pixels using the resolved visibility value; and determining the reflectance of each image pixel.

Third embodiment of the invention. In yet another embodiment, this invention features an improved method of correcting for atmospheric effects on a remote image of the Earth's surface taken from above, wherein the image comprises a number of simultaneously acquired images of the same scene, each including a large number of pixels, each at a different wavelength band, and including infrared through ultraviolet wavelengths, comprising: providing a radiation transport model that relates spectral radiance to spectral reflectance via a set of parameters; dividing the image into a plurality of sub image areas, each comprising a plurality of pixels; determining for each sub image area a blended water vapor column density; for each sub image area, using the radiation transport model and the blended water vapor column density to determine a single value for several variables in the radiation transport model; and calculating the surface reflectance for each pixel in each sub image area from the several variables determined for the sub image area in which the pixel is found, and the spectral radiance for the pixel.

Fourth embodiment of the invention. In a fourth embodiment, featured is an improved method of correcting a shift in wavelength calibration of a two dimensional focal plane array used to capture a remote image of the Earth's surface taken from above, wherein the image comprises a number of simultaneously acquired images of the same scene, each including a large number of pixels, each at a different wavelength band, and including infrared through ultraviolet wavelengths, comprising: providing a nominal channel wavelength calibration value for each channel in the image; dividing the pixels into a plurality of strips, each corresponding to a narrow range of focal plane array cross-track pixel locations; determining for each strip a set of sub-channel wavelength values that are derived from the nominal channel wavelength calibration values; providing a radiation transport model that relates spectral radiance to spectral reflectance via a set of parameters; calculating radiation model parameter values for each sub-channel; and determining the reflectance of each image pixel using the calculated model parameter values.

Fifth embodiment of the invention. In another embodiment, this invention features an improved method of correcting for atmospheric effects on a remote image of the Earth's surface taken from above, wherein the image comprises a number of images of the same scene each including a large number of pixels, each at a different wavelength band, and including ultraviolet through infrared wavelengths, comprising: providing a radiation transport model that relates spectral radiance to spectral reflectance via a set of parameters; providing a discrete number of trial aerosol visibility values and either trial aerosol property values or aerosol types; using the radiation transport model to calculate the model parameter values for each of the trial aerosol visibility values; selecting image pixels having a multiplicity of presumed, predefined ratios of reflectances among a multiplicity of wavelengths bands; using the radiation transport model parameters to determine the surface reflectance for the selected image pixels for each of the multiplicity of wavelength bands for each combination of trial visibility value and trial aerosol property value or values, or aerosol type; comparing the determined surface reflectances to the predefined ratios of reflectances; and resolving from the comparison a combination of visibility value and aerosol property value or values or aerosol type for the corrected image.

The various embodiments may each include the following more specific features. The radiation transport model calculations may be performed for the specific geometric conditions of solar illumination and sensor viewing that apply to the image being analyzed. The radiation transport model calculations may alternatively be performed for a plurality of geometric conditions of solar illumination and sensor viewing, with the calculation results stored, and the stored results interpolated to the specific geometric conditions that apply to the image being analyzed. The radiation transport model calculations may calculate the radiance from the surface that is scattered into the sensor by weighting the spectra from different parts of the surface according to their contributions to each pixel, as described by a point-spread function. The radiation transport model may include MODTRAN. The sensor viewing angle may be nadir or off-nadir.

BRIEF DESCRIPTION OF THE DRAWING

The drawing depicts the steps of the preferred embodiment of the inventive method.

DESCRIPTION OF THE PREFERRED EMBODIMENTS

Aerosol Retrieval Method

Figure 1:
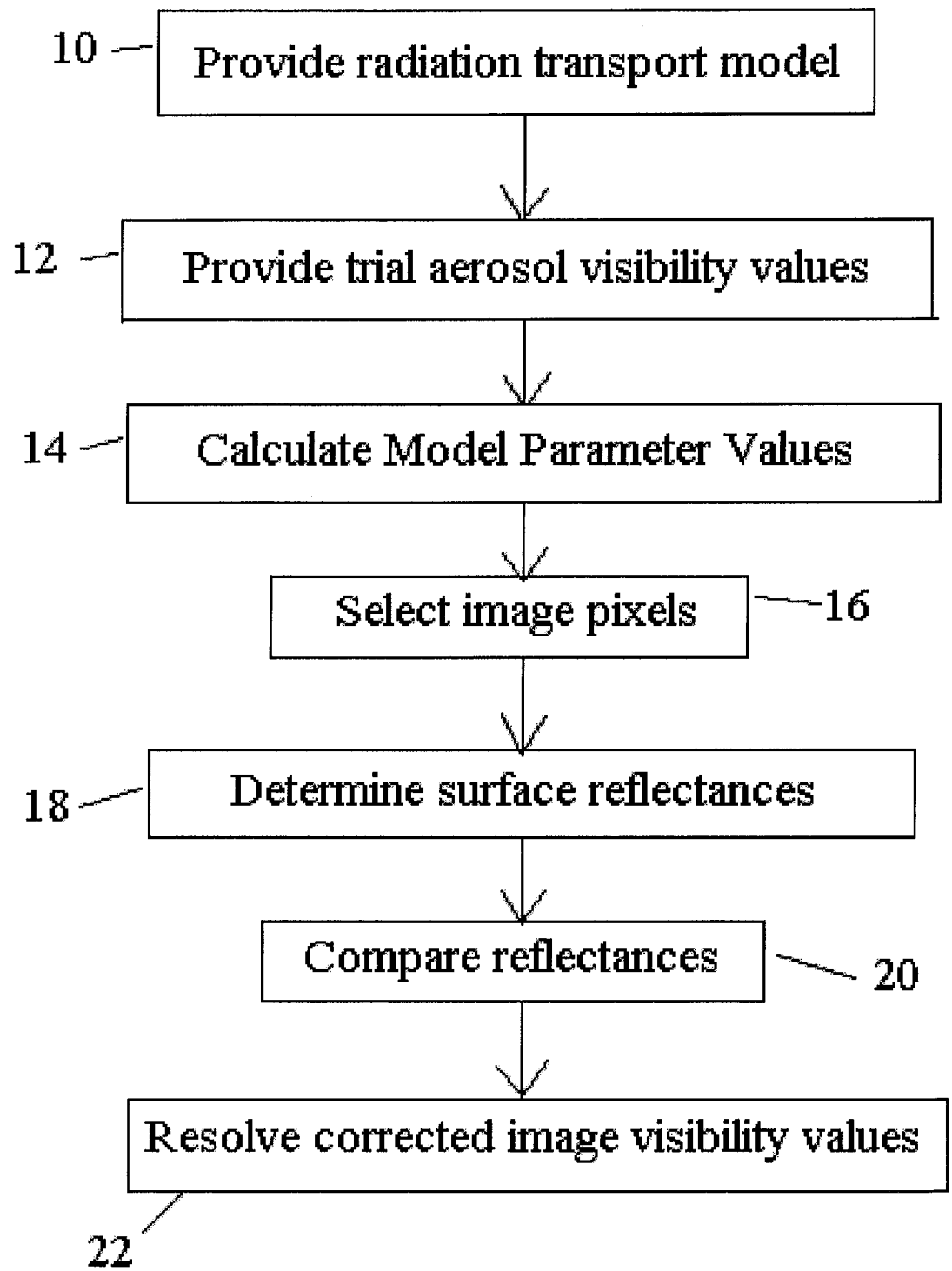

The prior art method for aerosol/haze retrieval used in both the SSI/AFRL and ATCOR2 atmospheric correction codes involves (1) establishing a set of MODTRAN radiance calculations assuming a certain aerosol/haze type (e.g., rural, urban, etc.) and covering a range of visibility (the meteorological visible range in km at 550 nm); (2) identifying specific pixels in the image that are known to have a certain reflectance value in a given wavelength band selected by the analyst; (3) matching the in-band radiances for those pixels to the MODTRAN calculations and reporting a visibility value for each pixel, accounting for the "adjacency effect". This method is not well suited to automated data processing, however, because of the need for user selection of the pixels. Even when user supervision is permitted, the image may not contain a target whose reflectance is accurately known a priori.

The features of the invention described below is a method for retrieving a sufficiently accurate visibility estimate from a spectral image by utilizing pixels that have a known ratio of reflectances in different wavelength bands. The method can be implemented in either a supervised fashion, with the user selecting the pixels to be utilized, or in an automated fashion in which the pixels are selected according to some reflectance criterion. The scientific basis of this method is that the ratios of reflectances are often much better defined than are the reflectance values themselves. In particular, it has been shown that there exist approximate empirical ratios between visible reflectances (e.g., at 0.66 microns) and a SWIR reflectance region (e.g., 2.1-2.2 microns) for "dark" natural terrain such as vegetation [Kaufman et al. 1997]. Since SWIR reflectance from such terrain is low, the "dark" terrain pixels in an image may be identified by using a maximum SWIR reflectance criterion. In general, the use of a reflectance ratio is advantageous when the pixels to be used for the visibility retrieval have a known reflectance spectrum shape but may have an uncertain absolute reflectance due to BRDF effects, shadows, moisture, etc.

In a preferred embodiment of the invention, the inputs are (1) the MODTRAN-calculated parameters A, B, S and $L^*_a$ covering the range of trial visibilities, as described in the prior art, (2) the sensor channel designations that define two bandpasses to be used for the aerosol retrieval, (3) an assumed reflectance ratio for the two bandpasses, and (4) a means for selecting the pixels to be utilized for the retrieval. For automated operation using natural dark terrain (preferably vegetated, not shade or water), a preferred means is to apply a reflectance cutoff value (such as 0.10) for the longer wavelength bandpass that defines the maximum value for the selected pixels. These inputs will preferably pertain to bandpasses around 0.66 microns and 2.1 microns. Radiance images and $L^*_e$ images in each of the two specified bandpasses are then assembled from both the original data cube and the spatially averaged radiance data cube that is generated for the solution of Equation (1) accounting for the adjacency effect. The reflectance solution is then constructed for the two bandpasses for each of the trial visibility values. The results are compared with the assumed reflectance ratio, and images are tabulated of the short-wavelength "excess reflectance", defined as the amount by which the retrieved short wavelength reflectance exceeds the ratio-predicted reflectance. The sign of the excess reflectance depends on whether the trial visibility is greater than or less than the "correct" visibility. Therefore, an estimate for the correct visibility for each selected pixel may be obtained by linearly interpolating among the trial excess reflectances to find the visibility corresponding to an excess reflectance value of zero. An efficient way to calculate a scene-average visibility is to add or average together the excess reflectances for all the selected pixels and perform the interpolation on the result.

In some sensors the short wavelength and long wavelength bandpass images are collected from different focal planes, causing possible spatial misalignment of up to half a pixel. The effects of the misalignment are expected to average out over continuous regions of "dark" pixels (i.e., pixels that satisfy the long wavelength reflectance cutoff). However, problems can potentially arise at the boundaries between dark and non-dark pixels, where contamination of the dark pixel short wavelength radiance due to adjacent non-dark pixels may cause a small net positive bias in the short wavelength excess reflectance, hence a small negative bias in the visible range. To minimize this problem one should exclude all boundary dark pixels (those neighboring non-dark pixels) from the selected set.

The above reflectance ratio-based visibility retrieval method has been tested using data from several different hyperspectral sensors. When using "known" reflectance pixels such as calibration panels, the results were compared with the prior art absolute reflectance-based method. When using natural dark terrain, the consistency of the results was assessed using different reflectance cutoffs and different reflectance ratio values within the tolerances found by Kaufman et al. [1997] (e.g., a ratio of between 0.4 and 0.5 for bandpasses around 0.66 microns and 2.1 microns). Based on these results, the retrieval accuracy obtainable by this method is approximately 0.01 to 0.02 per km for 1/visibility (in units of base 10 horizontal optical depth at 550 nm). The results are less sensitive to the precise value of the ratio when a low reflectance cutoff such as 0.04 is used. However, a disadvantage of a low cutoff is the tendency to select pixels containing water at the expense of vegetation; shallow water can have a different reflectance ratio and thus give anomalous results. A more sophisticated pixel selection procedure method, such as one that includes one or more minimum reflectance criteria to discriminate against water and shadows, provides better results.

In an extension of the above described visibility retrieval method, a multiplicity of reflectance ratios based on a multiplicity of wavelength bandpasses would be specified for the "known" pixels, and the visibility value would be retrieved that yields the best overall agreement of the data-derived reflectances with the specified ratios for these pixels. For example, Kaufman et al. have reported that reflectances at 0.47 microns as well as at 0.66 microns are in a characteristic ratio to the reflectances at 2.1 microns for dark terrain. With the use of a multiplicity of ratios, other aerosol parameters could be retrieved simultaneously with the visibility value. There are a number of possible properties that may be retrieved and embodiments of this method that may be chosen. In one example, the fitting process would be performed for each of a set of standard MODTRAN aerosol "types" (e.g., rural, urban, maritime, desert, etc.), and the type that produces the best agreement with the specified ratios would be selected as that which best represents the scene being analyzed. Each of these aerosol "types" is specified by individual properties, such as single-scattering albedo, scattering phase function, and particle size distribution. Thus, instead of retrieving an aerosol "type", one could retrieve parameters that describe these properties, such as mean single-scattering albedo, asymmetry parameter of the scattering phase function, or mean particle size, using an analogous fitting process.

Cloud Identification

The features of the invention described in this section are a method of processing spectral imagery in which a cloud "mask", which specifies the location of cloud-containing spectral image pixels, is created and then utilized in an atmospheric correction process to improve the accuracy of retrieved reflectances in the clear regions of the image.

A number of cloud detection algorithms have been developed that utilize multispectral data, but none have been developed specifically for hyperspectral data. A comprehensive look at cloud detection in multispectral instruments is presented by Ackerman et al. [1998], who developed an algorithm for the MODIS sensor. They apply a series of tests that generate a confidence level indicator that varies from 0 (confident cloudy) to 1 (confident clear); this is done by combining individual test output indicators by taking the minimum or the product. The tests include the following:

1. A color balance test based on a SWIR/red reflectance ratio, where $\rho(0.87\ \text{microns})/\rho(0.66\ \text{microns})$ between 0.9 and 1.1 indicates clouds. Alternatively, a more complicated expression involving these bands may be used.

2. A reflectance test at 0.94 microns, where water vapor absorbs. Low absorption correlates with low apparent column water vapor and hence reflection from bright, elevated objects (i.e., opaque clouds).

3. A variety of IR brightness tests.

In a paper on simple algorithms for multispectral atmospheric correction, Borel et al. [1999] discuss an analogue to the SWIR/red ratio test that combines an upper threshold on the NDVI (Normalized Differential Vegetation Index) with a lower threshold on the SWIR bandpass (i.e., a brightness test). They also describe a water vapor absorption test involving a continuum interpolated band ratio (CIBR).

With typical solar-wavelength hyperspectral sensors there is no IR coverage past 2.5 microns but there is high spectral resolution that permits a good column water vapor retrieval. Therefore, an opaque cloud mask was devised herein, based on combining tests for brightness, color balance, and low column water in the visible and SWIR regions. Because of processing time constraints, it is advantageous to utilize bands that are already being gathered by the atmospheric correction code for other purposes (e.g., 2.1 microns, 1.13 microns water absorption and reference bands, 0.66 microns, red, blue, green) and using the retrieved water vapor amounts. With this information, the cloud mask can be determined.

From the standpoint of atmospheric correction, the main complexity posed by the presence of clouds arises from the adjacency effect compensation, which requires a spatially smoothed radiance. It is not appropriate to include cloudy pixels in the smoothed radiance, which means that a cloud mask must be determined prior to both the aerosol retrieval and the atmospheric correction. A cloud test based on water vapor must therefore use some assumed aerosol amount, and a test based on reflectances cannot include the adjacency effect compensation.

Given these requirements for cloud detection, a preferred sequence of steps for the atmospheric correction process as a whole is as follows:

1. Initial water vapor retrieval. A nominal visibility is assumed.

2. Cloud mask definition. Brightness and color balance tests are applied to establish probable clear pixels, and a spatially average water vapor average is taken. Pixels containing significantly lower water vapor than this spatial average are identified, and the results of this test and the other tests are combined to define the opaque cloud mask.

3. Spatial smoothing of the radiance. Prior to smoothing, the scene-average radiance replaces the actual radiance in the cloud-masked pixels.

4. Aerosol (visibility) retrieval. The automated ratio-based algorithm is used with adjacency correction (both the smoothed and unsmoothed radiances are input).

5. Refined water vapor retrieval. The derived visibility and perhaps a narrowed range (in comparison to step 1) of water column amounts are used.

7. The cloud mask may optionally be recalculated, but it should not be much different than before.

8. Full reflectance retrieval.

A preferred embodiment for the cloud mask generation method of the invention, which may also be used with the prior art SSI/AFRL atmospheric correction method, is described below. Brightness, color balance, and water vapor tests are used in combination to define an opaque cloud mask.

The brightness test requires that an atmospheric correction to reflectance units be performed for at least one sensor bandpass. Since the water reference reflectance channel average (taken from either side of 1.13 microns) and a corresponding reflectance are already generated, it can be used for the brightness test. Borel et al. have recommended a reflectance lower threshold of around 0.3 for clouds in the SWIR. A similar value, 0.4, is recommended herein based on trial and error.

The color balance test involves comparing at least two bandpasses at different wavelengths. One bandpass can be the water reference, the second can be a visible bandpass, preferably green wavelengths, properly scaled. The test outcome is positive if the ratio of effective reflectances (radiance divided by the solar function) in the green and water reference bandpasses is unity to within some bounding values. Preferred bounding values determined by trial and error are 0.4 and 1.2.

The low-water test involves comparing the pixel's column water vapor with a threshold value that is derived from pixels that fail both the brightness and color balance tests and therefore are classified as clear. The threshold is defined with respect to a clear-pixel spatial average, obtained by convolving the clear pixel image with a window that is smaller than the image. Ideally, the window should be larger than typical cloud dimensions but smaller than typical large-scale topographic dimensions over which water can substantially vary. For example, a preferred window size for a cumulus cloud field is 40×40 pixels for 20 km sensor height AVIRIS imagery (20 m×20 m pixels). The outcome of the low-water test is defined to be positive for a pixel if its column water vapor is less than 85% of the clear-pixel value.

Reflectance Calculation Speedup

The features of the invention described in this section are a method for fast atmospheric correction of spectral imagery in which the parameters of Equation (1), A, B, S, $L^*_a$ and $\rho_e$, are approximated by average values for a group of nearby pixels, referred to as a "superpixel". The method takes advantage of the fact that Equations (1) and (2) relating radiance to reflectance can be transformed into the linear equation, $$\rho = mL^* + b \qquad \text{equation (3)}$$

where m and b are expressed in terms of A, B, S, $L^*_a$ and $L^*_e$ values for each superpixel.

In a preferred embodiment, the superpixel consists of a N×N array of image pixels, where N is 2 or greater. A, B, S, $L^*_a$ depend on the water vapor column density, which varies across the scene. Suitable values for these parameters are determined by using the superpixel-average water vapor amounts to interpolate from LUTs constructed from radiation transport calculations performed for specific water vapor amounts. The superpixel-average water vapor amounts may be averages of amounts retrieved from individual pixels. Alternatively, they may be water amounts retrieved from superpixel-average radiances. $\rho_e$ is also calculated from the value of $L^*_e$ for the superpixel using equation (2). Note that since $L^*_e$ is itself a spatial average, for practical purposes it does not need to be calculated on a single-pixel basis in the first place. The A, B, S, $L^*_a$ and $L^*_e$ results are used to define m and b in Equation (3). Then $L^*$ for each pixel within the superpixel is inserted and $\rho$ for each pixel is calculated, which now requires only two calculations (a multiplication and an addition) per wavelength channel.

The speedup in the calculation of the reflectance compared to the prior art derives from the fact that the interpolations and other mathematical steps required to generate m and b are performed only once per N×N pixels. In the limit of large N, the Equation (3) calculation requires only two mathematical operations (an addition and a multiplication) per pixel per channel and therefore can approach the speed of the Empirical Line Method.

Spectral Smile Compensation

With a typical 2-dimensional focal plane array (FPA) spectrograph, one dimension of the FPA (parallel to the direction of spectral dispersion) is used to define the spectral channels, and the other dimension of the FPA is used to define a spatial dimension. In remote hyperspectral imaging applications, the FPA spatial dimension corresponds to the "cross-track" direction of the image (perpendicular to the direction of travel of the sensor). Spectral smile refers to the (typically) positive shift in the wavelength calibration (the channel center wavelength values) of a 2-dimensional array spectrograph as the cross-track pixel location proceeds from the center to the edges of the image (i.e., as one proceeds from the center to the edges of the FPA). The features of the invention described in this section are a method of accounting for the effect of spectral smile in the atmospheric correction of data taken with a 2-dimensional FPA spectrograph. The invention also can be used to account for other types of pixel-dependent wavelength variations, including that caused by a rotational misalignment between the FPA and the direction of spectral dispersion (which, unlike smile, is not symmetric about the center of the image).

The general approach is to divide the spectral image into "strips" of pixels. Each strip, which corresponds to some narrow range of cross-track pixel locations, is assigned its own set of sub-channel wavelengths that are shifted by some characteristic amounts from the "nominal" channel wavelength calibration. If there are N sensor channels and w strips in the image, there are a total of (N×w) sub-channel wavelengths. The parameters of Equations (1) and (2) (A, B, S, $L^*_a$) are calculated for each of these sub-channels and are used to atmospherically correct the pixels in each strip. It is presumed that the spectral smile or other pixel-dependent wavelength variation of the sensor has been characterized numerically, such as by a table or by a mathematical formula such as a polynomial expression. The number of strips w must be sufficient that the wavelength differences between adjacent strips are small compared with the spectral half-width of the wavelength channels. For a typical hyperspectral sensor with partially overlapping channels, a suitable w may be on the order of 5.

The first step is to divide the image into suitable strips (i.e., assign to each pixel a strip index j, which is an integer that varies from 1 to w). There are many ways by which this can be done. In one embodiment, one channel (preferably, one exhibiting a large spectral shift) may be specified as a "standard" channel; the wavelength range for the standard channel over the focal plane is computed and is divided equally into w equally-spaced bins. Then, each pixel is assigned its j value based on the bin into which its wavelength falls. If the superpixel method described previously is used, then j is defined for each superpixel rather than for each pixel.

The second step is to assign the sub-channel wavelength values. A preferred embodiment is to gather all pixels with the same j and average together their wavelength values for each corresponding channel. In this way, the sub-channel wavelength values best represent the pixels to which they are assigned.

The third step is to calculate the Equation (1) and (2) parameters for each of the Nw sub-channels. This is done exactly as in the prior art, except that now there are a factor of w more values.

The fourth step is to perform the water vapor retrieval and atmospheric correction (reflectance calculation) steps using the parameters from the third step. This is done exactly as in the prior art, except that now the parameters are selected not only in accordance with the water vapor amount for each pixel (or superpixel) but also in accordance with the strip index (j) value for each pixel (or superpixel). Note that for aerosol determination the prior art method (i.e., without smile compensation) is satisfactory, because the wavelength regions used for that purpose are essentially unaffected by small wavelength shifts.

In a generalization of the above method, j could be a function not only of the cross-track pixel location but also of the channel number. This generalization would allow improved accuracy in a situation where the nature of the wavelength variation across the image is different at different wavelengths (for example, if the wavelength variation error were dominated in one range of wavelengths by spectral smile and in another range of wavelengths by rotational misalignment).

Other embodiments will occur to those skilled in the art and are within the following claims:

What is claimed is:

1. A method of correcting for atmospheric effects on a remote image of the Earth's surface taken from above, wherein the image comprises a plurality of images of the same scene each including a large number of pixels, each at a different wavelength band, and including infrared through visible wavelengths, comprising:
   a. providing a radiation transport model that relates spectral radiance to spectral reflectance via a set of parameters;
   b. providing a discrete number of trial aerosol visibility values for at least one of one or both of trial aerosol property values and aerosol types;
   c. using the radiation transport model to calculate the model parameter values for each of the trial aerosol visibility values;
   d. selecting image pixels having unknown reflectances but having one or more presumed, predefined ratios of reflectances among two or more specific wavelength bands;
   e. using the calculated model parameter values to determine the surface reflectance for the selected image pixels for each of the specific wavelength bands for each combination of trial visibility value and trial aerosol property value or values, or aerosol type;
   f. comparing the determined surface reflectances to the predefined ratio of reflectances; and
   g. resolving from the comparison a corrected image visibility value for each trial aerosol property value or values or aerosol type.

2. The method of claim 1, in which using the radiation transport model to calculate the model parameter values includes performing calculations for the specific geometric conditions of solar illumination and sensor viewing that apply to the image being analyzed.

3. The method of claim 1, in which using the radiation transport model to calculate the model parameter values includes performing calculations for a plurality of geometric conditions of solar illumination and sensor viewing, storing the calculation results, and interpolating the stored results to the specific geometric conditions that apply to the image being analyzed.

4. The method of claim 1, in which using the radiation transport model to calculate the model parameter values includes performing calculations of the radiance from the surface that is scattered into the sensor by weighting the spectra from different parts of the surface according to their contributions to each pixel.

5. The method of claim 1, in which the radiation transport model includes MODTRAN.

6. The method of claim 1, in which the sensor viewing angle is nadir.

7. The method of claim 1, in which the sensor viewing angle is off-nadir.

8. The method of claim 1, in which trial aerosol visibility values are provided for a plurality of trial aerosol property values; a multiplicity of specific wavelength bands are specified; the number of predefined ratios of reflectances is greater than one; and in which by comparing the determined surface reflectances to the predefined ratios of reflectances both the corrected image visibility value and the aerosol properties or the aerosol type are resolved.

9. The method of claim 1, in which trial aerosol visibility values are provided for a plurality of aerosol types; a multiplicity of specific wavelength bands are specified; the number of predefined ratios of reflectances is greater than one; and in which by comparing the determined surface reflectances to the predefined ratios of reflectances both the corrected image visibility value and the aerosol properties or the aerosol type are resolved.

* * * * *